UNITED STATES PATENT OFFICE 2,121,087

SHIP DECK MORTAR-LIKE ADHESIVE PLASTIC

Joseph Labra, Long Island City, N. Y.

No Drawing. Application August 20, 1936,
Serial No. 96,968

5 Claims. (Cl. 106—23)

This invention aims at improving the consistency, permanency, and also the practicability of a cement mortar; a composition comprising rubber latex, Atlas lumnite and Portland cements, lumnite and Portland cements mixed with other ingredients and chemicals to a building mortar-like plastic.

Its object is to provide a composition which can be effectively used for various purposes in the building industry; a substantial, lightweight, water-repulsive composition, capable of adhering to objects such as wood, metal, stone, stucco, brick, tile, concrete, and any surface such as walls, floors, ceilings, and the like, thus eliminating the use of metal lath and other materials heretofore used in present methods of building, when stucco, tile, or brick is to be applied.

Another object of the invention is to provide a hard, yet elastic enough, composition for the simplification of exterior siding, stucco, brick or tile veneering on frame or other building structures with substantial materials and using an inexpensive method in applying same.

Still another object of the invention is to provide an improvement in a composition which can be effectively used for filling cracks in concrete and similar constructions.

It is well known that casein is an excellent adhesive and that in an alkali colloidal solution it has preserving power over liquid colloidal latex. I make use of these qualities with other chemicals and materials mixed in a way that the obtained results is a cement mortar-like; a composition which can be spread over a floor or side walls of a building without the aid of any other adhesive, metal lath, or other device; and which will dry hard and wear similar to cement mortar; that is tenacious enough to hold tile or brick in place and is water repulsive.

As an example in carrying out my process, I prefer to use the following materials and chemicals in the approximate relative proportions as indicated below. This is given purely for the purpose of illustration. To 12 gallons of water: 5 ozs. sodium salicylate; 2½ ozs. sodium carbonate; 30 ozs. calcium hydroxide; 20 ozs. trisodium phosphate; 25 lbs. casein; 2½ lbs. hexamethylenetetramine; 20 ozs. sulphonated castor oil; 10 gallons of rubber latex (preferably 60% solids); 30 ozs. sulphur (preferably flowers); 20 ozs. zinc oxide. This solution is now thoroughly mixed, and the results are the one alkali colloidal casein latex compound.

Then a second component is added consisting of mineral cementing powders, such as Portland cement, Atlas hydraulic lumnite cement, Keens, and other chemical action cements. Hydrate alumina, soapstone, and the like. Filling materials, such as asbestos fibres, wood fibres, powdered cork, sand, clay, and others, may also be added at this point, although building sand is preferable. The following is just as an illustration in the method of the embodiment of my invention with the addition of cement powders.

Measure of parts by volume: 2 parts Portland cement
1 part Atlas lumnite cement
1 part asbestos fibre is now incorporated into: 3 parts by volume of the first alkali colloidal casein latex compound, mixed thoroughly, and is ready for use.

It is well to keep the first alkali colloidal casein latex compound a few days in closed containers to permit the partial vulcanization of the rubber prior to the admixture of the second compound of Portland cement and other materials.

It is understood that sulphur in this composition is a vulcanizing agent and that it may be substituted with other rubber vulcanizing agent.

Hexamethylenetetramine is an accelerator assisting the sulphur in the vulcanization of the rubber. Diphenylguanidine, aldehyde-ammonia, diorthotolylguanidinehexamethyleneamine anhydroformaldehydeaniline, or other accelerators may also be used in this compound, but hexamethylenetetramine has the added asset of assisting the casein in becoming more waterproof. There may be a variation of ingredients in the composition if desired, and the weights in the example given are only meant as an approximation; for instance the calcium hydroxide may be decreased 5% or increased as much as 6% of the amount given in the first sample.

The case is such that some times, and in some particular places, the building cement mortar and plastic requires to be more tenacious then others, therefore a slight change in the proportion of weights and measures of materials in my invention are most favorable.

I found that the addition of chloride, such as calcium chloride and sodium chloride, to my compound, will help to lower the freezing point of the cementing mortar in times of freezing temperature and hastens the setting. Another example not quite so similar as the first: To 11 gallons of water; 7 ozs. sodium salicylate; 3 ozs. sodium carbonate; 35 ozs. calcium hydroxide; 20 ozs. trisodium phosphat (tertiary); 5 ozs. sodium tungstate; 30 ozs. sodium chloride; 25 lbs. casein. Stir the solution until it thickens. Now it must be allowed to set over night. After setting the following compound is added to the above: 2½ lbs. of hexamethyleneamine are dissolved in one gallon of water; 25 ozs. sulphonated castor oil (or other water soluble oil) is stirred into 10 gallons ammonia treated rubber latex (preferably containing 60% of dry rubber solids). The above are stirred together and the following added: 30 ozs. sulphur chloride, 20 ozs. zinc oxide—or zinc chloride. This solution is thoroughly mixed and the second compound is made up. Measuring by volume: 3 parts of Portland cement; 4 parts beach sand; 4 parts alkali colloidal casein latex compound. mixed thoroughly and is ready for use.

Other examples are: Incorporating the alkali colloidal solution into the mineral cement making powders as follows:

|  | Parts |
|---|---|
| Portland cement | 3 |
| Latex solution | 3 | and small portion of hydrate alumina to hasten the setting if desired. Another example:

|  | Parts |
|---|---|
| Keens cement | 4 |
| Latex solution | 3 | hydrate alumina about 5% of the two above combined parts. Other ingredients such as waxes, camphors, resins, and so forth may be added to any or to all the mixtures so as to obtain certain desired results.

Beach sand will not coagulate the latex, and for some purposes such as floor tiling and for filling of large brick joints, it is advisable to use a large proportion of sand mixed in the approximation of two parts sand to one part Portland cement dissolved in a sufficient latex solution to a workable plastic. Care must be taken when using water absorbing substances that are to be incorporated into the alkali colloidal solution as an excessive amount will coagulate the rubber. I have found that it is not practical to fix an exact amount of the water absorbing substances that are to be added to the proportional amount of the alkali colloidal solution due to the atmospheric changes. My method is to prepare one amount of all the water absorbing substances, smaller in proportion than the one given in my illustration. When all is mixed together I add to it the alkali colloidal solution. The results are then mixed thoroughly and keep adding more of the proposed absorbing substances until the whole mixture becomes of the consistency of a soft workable building mortar cement. A small amount of hydrate alumina may be added at this point.

Casein is a stabilizer and other stabilizers such as starch, egg albumen, glues and the like may be used and are adaptable to my invention, but the preference is for casein as it is more waterproof.

Flexible gums, such as gutta percha, rubber, or rubber containing substances, either natural or synthetic gums. are also adaptable in the making of my composition, but the compound will not be as water-repulsive.

The chemical action mineral cementing powders can be used together in combined amounts or each one can be individually used with the latex compound, by adding to the latex sufficient cement powder until it is of the consistency of common building cement mortar.

*Example*

|  | Parts |
|---|---|
| Alkali colloidal casein latex | 2 |
| Portland cement | 3 | make a fine cement plastic.

When the composition is to be used as a wall coating or floor covering, or for other purposes than joining two things together, other filling materials such as coloring agents, waxes, resins, lacquers, camphors, and the like, may be added to the plastic, so as to give certain properties to the finished composition and to mulsify the plastic therein.

This composition, comprising the alkali colloidal solution, and the Atlas lumnite, and Portland cement, is not meant to be restricted to any particular class or grade of mortar, as such may be weak or strong, nor to one exact quantity weight or measure of ingredients such as the instances given in this specification, which are only referred to as merely illustrations. The rubber latex described in my specifications is concentrated rubber latex and can be substituted with the ordinary rubber latex of commerce, which is practicable in my invention and may have a variation of rubber solids, from its 33% of the original state, to its final concentration which is about 75% dry solids.

Vulcanization of the compound may be effected either before the admixture of the rubber latex with the casein or after by the addition of vulcanizing agents and accelerators or by other well-known methods. Wherever the word casein occurs, it is meant to include caseins made under any process of manufacture, or any other caseins, such as are blown milk caseins, sulphuric, hydrofluoric, acetic, lactic, and others, so that each and every one is adaptable for the purpose in my composition.

Wherever the word casein solvents is used, it is meant for solvents of caseins, such as sodium carbonate, sodium hydroxide, trisodium phosphate, and other solvents, and that the composition is not to be restricted to the described solvents and to the accuracy of its proportions.

Chlorides of calcium, sodium, copper, zinc, ammonium, magnesium, etc., such as calcium, sodium, copper, zinc, ammonium magnesium, and others are also practicable for various purposes in the making and adding of certain beneficial assets, to the cement mortar, such as hastening its set, and for anti-freezing purposes when exposed to low temperatures, and in some cases assists in stabilizing the casein solvents.

I have found that the composition gives very satisfactory service when used in all kinds of tiles for cementing the same to walls, floors, or other surface supports.

I have also found that cracks in concrete and other similar materials may be filled with the composition so that the repaired work does not disclose the filling material.

Having described my invention, what I claim as new—and desire to secure by Letters Patent is:

1. A plastic mortar-like composition consisting in a combination compound comprising 3 parts by volume of hydraulic cement mixed there into two (2) parts by volume of an aqueous alkali colloidal casein latex compound containing 43% water, 40% rubber latex, 12% casein, and a quantity of sodium salicylate, sodium carbonate, calcium hydroxide, tri-sodium phosphate, zinc oxide, sulphur, sulphonated castor oil and hexamethyleneamine amounting to 5% of the liquid colloidal.

2. An adhesive mortar-like plastic composition consisting in a combination compound containing (3) parts by volume of hydraulic cement and one (1) part by volume of asbestos fibres both dissolved into three (3) parts by volume of an aqueous alkali colloidal casein latex compound comprising ingredients in the approximate relative proportions indicated—8 lbs. liquid, as latex, 2½ lbs. casein, 1 lb. auxiliars as herein set forth and 9 lbs. water to dissolve the casein and assisting ingredients.

3. An adhesive like building plastic composition consisting in a compounded mixture of ingredients in the relative proportions indicated—2 parts by volume (Keen's) white cement, 4 parts by volume of soap-stone, both dissolved into three (3) parts by volume of an aqueous casein and rubber latex compound comprising 42½% water, 40% liquid rubber, as latex, 12½% casein, and 5% casein solvents, vulcanizing agents and accelerators as set forth.

4. An adhesive like plastic composition consisting in a compounded mixture of materials and ingredients mixed in the relative proportions indicated—3 parts by volume of hydraulic cement and four (4) parts by volume of sand mixed therewith four (4) parts by volume of an alkali colloidal casein-latex solution comprising 10 gals. liquid as latex, 25 lbs. casein and 12 gals. water into which during preparation is added ten (10) lbs. of assisting waterproofing, drying and vulcanizing agents, solvents and accelerators as herein set forth.

5. An adhesive building mortar-like composition produced by a combination of materials in the approximate relative proportions indicated— 3 parts by volume of hydraulic cement and 2 parts of a ground filler (inert) dissolved into four (4) parts by volume of natural or synthetic liquid rubber and starch, gummy solution comprising 80 lbs. rubber, as latex, 15 lbs. starch, 15 lbs. animal glue and 100 lbs. water to which during preparation is added solvents, vulcanizing and waterproofing agents as set forth herein.

JOSEPH LABRA.